2,941,892
Patented June 21, 1960

2,941,892

SPINNING OF VISCOSE

Edward M. Simon, Jr., Media, Pa., assignor to Atlas Powder Company, Wilmington, Del., a corporation of Delaware No Drawing. Filed Jan. 31, 1955, Ser. No. 485,347

5 Claims. (Cl. 106—165)

This invention relates to the regeneration of cellulose from viscose solutions and more particularly to the manufacture of regenerated cellulose articles such as yarn and film from viscose.

It is an object of the invention to provide a process for producing regenerated cellulose yarn having novel and desirable properties.

Another object of the invention is to provide a process for producing high-tenacity regenerated cellulose yarn.

A further object is to provide a process whereby unripened viscose can be spun to produce a high-tenacity, fatigue-resistant regenerated cellulose fiber having improved soil and abrasion resistance.

A still further object is to provide novel viscose compositions adapted to the spinning of high-tenacity regenerated cellulose yarns.

The above and other objects will become more apparent in the course of the following description of the invention and in the appended claims.

The above objects are accomplished in accordance with the invention by incorporating in the viscose solution to be spun a compound which is a polyhydric alcohol, containing from 3 to 6 carbon atoms and at least ⅔ as many hydroxyl groups as carbon atoms, a hydroxyethyl or polyhydroxyethyl ether of such an alcohol, or a polyoxyethylene ether of such an alcohol. The said compound may be represented by the generic formula

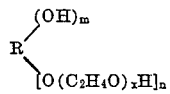

wherein R is the hydrocarbon residue of a polyhydric alcohol containing from 3 to 6 carbon atoms and at least ⅔ as many hydroxyl groups as carbon atoms, $m$ and $n$ each has any value from 0 to 6 such that their sum is equal to the number of hydroxyl radicals in said polyhydric alcohol, and $x$ has any value from 0 to 20. An exemplary list of compounds so-defined includes glycerol, propylene glycol, pentaerythritol, erythritol, xylitol, the several desoxy hexitols, sorbitol, mannitol, hydroxyethyl glycerol, hexahydroxyethyl sorbitol, penta hydroxyethyl mannitol, the polyoxyethylene ether of glycerol containing 50 oxyethylene groups, the polyoxyethylene ether of sorbitol containing 100 oxyethylene groups, the polyoxyethylene ether of pentaerythritol containing 60 oxyethylene groups, the polyoxyethylene ether of mannitol containing 120 oxyethylene groups, and the like.

The defined compounds are soluble in viscose solutions and may be incorporated therein at any stage of the viscose process after the cellulose is dissolved. For effective results, from about 0.75% to about 4% by weight of the polyhydric alcohol or ether-alcohol based on the weight of cellulose in the solution is employed. The composition of the viscose may vary widely as is known in the art. It may be formed from cotton linters or from wood pulp as the source of cellulose, and may contain from 4% to 10% of cellulose in a solution containing from 4% to 8% of alkali metal hydroxide. The amount of carbon disulfide used in xanthation may be from 25% to 50%.

The viscose solutions of the invention, i.e., those containing the modifying polyhydroxy compounds hereinbefore defined, may be employed in the normal manner for the production of regenerated cellulose films, and yarns. Suitable spinning or regenerating baths contain sulfuric acid, zinc sulfate and sodium sulfate. Preferred spinning baths contain from 4% to 12% sulfuric acid, from 1% to 10% zinc sulfate and from 13% to 25% sodium sulfate.

The following non-limiting examples illustrate the preparation of viscose solutions and production of regenerated cellulose yarn therefrom, both in accordance with the invention.

*Example I*

A cotton linters viscose containing 7% cellulose and 6.6% sodium hydroxide is prepared in the conventional manner except that during the dissolution of the xanthated cellulose in the aqueous sodium hydroxide, 1% by weight, based on the cellulose content, of the polyoxyethylene ether of sorbitol containing 100 oxyethylene groups per mol is added and thoroughly dispersed therein. The resulting viscose solution is spun in an unripened state into a bath containing 7% sulfuric acid, 8% zinc sulfate and 17% sodium sulfate. The spinning is carried out on conventional spinning equipment to produce a regenerated cellulose yarn of high tensile strength which is resistant to abrasion.

*Example II*

Viscose contains 7% cellulose, 6% sodium hydroxide and 0.055% sorbitol is prepared as follows: Alkali cellulose aged to obtain a suitable viscose viscosity is xanthated with 36% carbon disulfide. The xanthate crumbs are dissolved in aqueous solution containing sodium hydroxide solution and sorbitol in amounts to furnish the indicated percentages. After mixing, the viscose is filtered, deaerated and finally spun in an unripened state. The coagulating and regenerating bath contains 8% sulfuric acid, 8% zinc sulfate and 23% sodium sulfate. Yarns with smooth surface and high tenacity are obtained.

*Example III*

A wood pulp viscose containing 7% cellulose and 6.6% sodium hydroxide is prepared in the conventional manner except that 3%, based on the weight of cellulose, of the polyoxyethylene ether of mannitol containing 20 oxyethylene groups per mol is incorporated therein during dissolution of the xanthate in the alkali solution. After filtration and deaeration of the prepared viscose the solution is ripened for 36 hours and spun into a regenerating bath containing 8% sulfuric acid, 8% zinc sulfate and 23% sodium sulfate. The resulting yarn is fatigue resistant and of low soil retention.

In the illustrative examples, sorbitol and polyoxyethylene hexitols have been employed as the viscose modifying agents. Similar improved results may be obtained by employing any of the polyhydric alcohols and/or their oxyethylene or polyoxyethylene ethers as defined hereinbefore.

What is claimed is:

1. Viscose containing from 0.75% to 4.0%, based on the cellulose content of the viscose, of a polyoxyethylene ether of a 3 to 6 carbon polyhydric alcohol containing up to 20 oxyethylene groups per hydroxyl radical of said alcohol, the said polyhydric alcohol containing at least ⅔ as many hydroxyl groups as carbon atoms.

2. Viscose containing from 0.75% to 4%, based on the cellulose content of the viscose, of a polyoxyethylene ether of a hexitol.

3. Viscose containing from 0.75% to 4%, based on the cellulose content of the viscose, of a polyoxyethylene ether of sorbitol containing from 1 to 100 oxyethylene groups per mol.

4. A viscose spinning solution comprising from 4% to 10% cellulose, from 4% to 8% alkali metal hydroxide and from 0.75% to 4%, based on the weight of the cellulose, of a polyoxyethylene ether of a 3 to 6 carbon polyhydric alcohol containing up to 20 oxyethylene groups per hydroxyl radical of said alcohol, the said polyhydric alcohol containing at least ⅔ as many hydroxyl groups as carbon atoms.

5. In the spinning of regenerated cellulosic yarns from viscose the improvement which comprises dissolving in the viscose solution from 0.75% to 4%, based on its cellulose content, of a polyoxyethylene ether of a 3 to 6 carbon polyhydric alcohol containing up to 20 oxyethylene groups per hydroxyl radical of said alcohol, the said polyhydric alcohol containing at least ⅔ as many hydroxyl groups as carbon atoms.

References Cited in the file of this patent

UNITED STATES PATENTS

| | | |
|---|---|---|
| 1,922,459 | Schmidt | Aug. 15, 1933 |
| 1,929,868 | Haller et al. | Oct. 10, 1933 |
| 2,125,031 | Polak | July 26, 1938 |
| 2,373,712 | Schlosser | Apr. 17, 1945 |
| 2,440,094 | Israel | Apr. 20, 1948 |
| 2,489,310 | Moss | Nov. 29, 1949 |
| 2,593,466 | McLaurin | Apr. 22, 1952 |
| 2,674,619 | Lundsted | Apr. 6, 1954 |
| 2,677,700 | Jackson | May 4, 1954 |
| 2,732,279 | Tachikawa | Jan. 24, 1956 |
| 2,775,505 | Pedlow | Dec. 25, 1956 |
| 2,777,775 | Edwards | Jan. 15, 1957 |
| 2,805,169 | Mitchell | Sept. 3, 1957 |

FOREIGN PATENTS

| | | |
|---|---|---|
| 541,099 | Great Britain | Nov. 12, 1941 |
| 557,218 | Great Britain | Nov. 10, 1943 |
| 15,752 | Great Britain | of 1910 |